US012654508B2

(12) United States Patent (10) Patent No.: US 12,654,508 B2
Maeda (45) Date of Patent: Jun. 16, 2026

(54) BLOWER DEVICE

(71) Applicant: DENSO CORPORATION, Kariya-city (JP)

(72) Inventor: Kenichirou Maeda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/939,602

(22) Filed: Nov. 7, 2024

(65) Prior Publication Data

US 2025/0065688 A1 Feb. 27, 2025

Related U.S. Application Data

(60) Division of application No. 17/993,210, filed on Nov. 23, 2022, now abandoned, which is a continuation of
(Continued)

(30) Foreign Application Priority Data

May 29, 2020 (JP) ................................. 2020-094105

(51) Int. Cl.
 B60H 1/00 (2006.01)
(52) U.S. Cl.
 CPC .................... B60H 1/00021 (2013.01); *B60H 2001/00092* (2013.01); *B60H 2001/00107* (2013.01)
(58) Field of Classification Search
 CPC ...... B60H 1/00021; B60H 2001/00092; B60H 2001/00107
 See application file for complete search history.

(56) References Cited

U.S. PATENT DOCUMENTS 6,425,739 B1 * 7/2002 Ambler ................. F04D 29/444
 415/208.1
9,709,073 B2 7/2017 Otsuka et al.
(Continued)

FOREIGN PATENT DOCUMENTS

CN 105546663 A 5/2016
DE 112019006733 T5 10/2021
(Continued)

OTHER PUBLICATIONS

U.S. Appl. No. 17/993,210, filed Nov. 23, 2022, Kenichirou Maeda.

*Primary Examiner* — Nathaniel E Wiehe
*Assistant Examiner* — Jason G Davis
(74) *Attorney, Agent, or Firm* — Harness, Dickey & Pierce, PLC

(57) ABSTRACT

A blower device includes a centrifugal fan that sucks air from one side of the blower device in an axial direction, and an air flow guide disposed between the centrifugal fan and the other side of the blower device in the axial direction. A first air flow from the centrifugal fan is bent toward the other side in the axial direction. A second air flow from the centrifugal fan is bent toward the other side in the axial direction, and then bent inward in the radial direction. A ratio of a pressure loss in the second air flow to a pressure loss in the first air flow before a downstream end of the air flow guide is smaller than a ratio of a pressure loss in the second air flow to a pressure loss in the first air flow before an upstream end of the air flow guide.

1 Claim, 7 Drawing Sheets

Related U.S. Application Data application No. PCT/JP2021/019777, filed on May 25, 2021.

(56) References Cited

U.S. PATENT DOCUMENTS

| | | | |
|---|---|---|---|
| 10,118,502 B2 | 11/2018 | Yokote et al. | |
| 10,458,417 B2 | 10/2019 | Hsiung et al. | |
| 2017/0120717 A1* | 5/2017 | Sekito ............... | B60H 1/00028 |
| 2019/0270359 A1 | 9/2019 | Kato et al. | |
| 2020/0148025 A1 | 5/2020 | Tashima et al. | |
| 2020/0156433 A1 | 5/2020 | Yonezu et al. | |
| 2021/0331551 A1 | 10/2021 | Kato et al. | |
| 2023/0090312 A1 | 3/2023 | Maeda | |

FOREIGN PATENT DOCUMENTS

| | | | |
|---|---|---|---|
| JP | H08215528 A | 8/1996 | |
| JP | 2018118722 A | 8/2018 | |
| JP | 2019025941 A | 2/2019 | |
| WO | WO-2019021707 A1 | 1/2019 | |

* cited by examiner

ONE ← AXIAL DIRECTION → THE OTHER

RADIAL
DIRECTION

OUTWARD

INWARD

ONE ⟵⟶ THE OTHER
AXIAL DIRECTION

ONE ⟵⟶ THE OTHER
AXIAL DIRECTION

BLOWER DEVICE

CROSS REFERENCE TO RELATED APPLICATIONS

The present application is a divisional application of U.S. patent application Ser. No. 17/993,210 filed on Nov. 23, 2022 which is a continuation application of International Patent Application No. PCT/JP2021/019777 filed on May 25, 2021, which designated the U.S. and claims the benefit of priority from Japanese Patent Application No. 2020-094105 filed on May 29, 2020. The entire disclosures of all of the above applications are incorporated herein by reference.

TECHNICAL FIELD

The present disclosure relates to a blower device.

BACKGROUND

Conventionally, there has been proposed a vehicle air conditioner in which a centrifugal fan and a cooling heat exchanger are disposed in a casing.

SUMMARY

According to at least one embodiment of the present disclosure, a blower device includes a centrifugal blower, an air flow guide and a casing. The centrifugal blower includes a centrifugal fan that rotates about an axis, sucks air from one side of the blower device in an axial direction of the centrifugal fan, and blows the air outward in a radial direction of the centrifugal fan from a center located at the axis. The air flow guide is disposed between the centrifugal fan and the other side of the blower device in the axial direction. The casing accommodates the centrifugal fan and allows the air to flow as an air flow toward the other side in the axial direction. The air flow from the centrifugal fan includes a first air flow and a second air flow. The first air flow is from the centrifugal fan, bent toward the other side in the axial direction, and then toward the other side in the axial direction. The second air flow is from the centrifugal fan, bent toward the other side in the axial direction, and then bent inward in the radial direction. A first pressure loss is a pressure loss generated in the first air flow between the centrifugal fan and an end of the air flow guide facing the other side in the axial direction. A second pressure loss is a pressure loss generated in the second air flow between the centrifugal fan and the end of the air flow guide facing the other side in the axial direction. A first pressure loss ratio is a divided value obtained by dividing the second pressure loss by the first pressure loss. A third pressure loss is a pressure loss generated in the first air flow between the centrifugal fan and an end of the air flow guide facing the one side in the axial direction. A fourth pressure loss is a pressure loss generated in the second air flow between the centrifugal fan and the end of the air flow guide facing in the axial direction. A second pressure loss ratio is a divided value obtained by dividing the fourth pressure loss by the third pressure loss. The air flow guide makes the first pressure loss ratio smaller than the second pressure loss ratio.

BRIEF DESCRIPTION OF DRAWINGS

The details of one or more embodiments are set forth in the accompanying drawings and the description below.

Other features and advantages will be apparent from the description and drawings, and from the claims.

DETAILED DESCRIPTION

Figure 1:
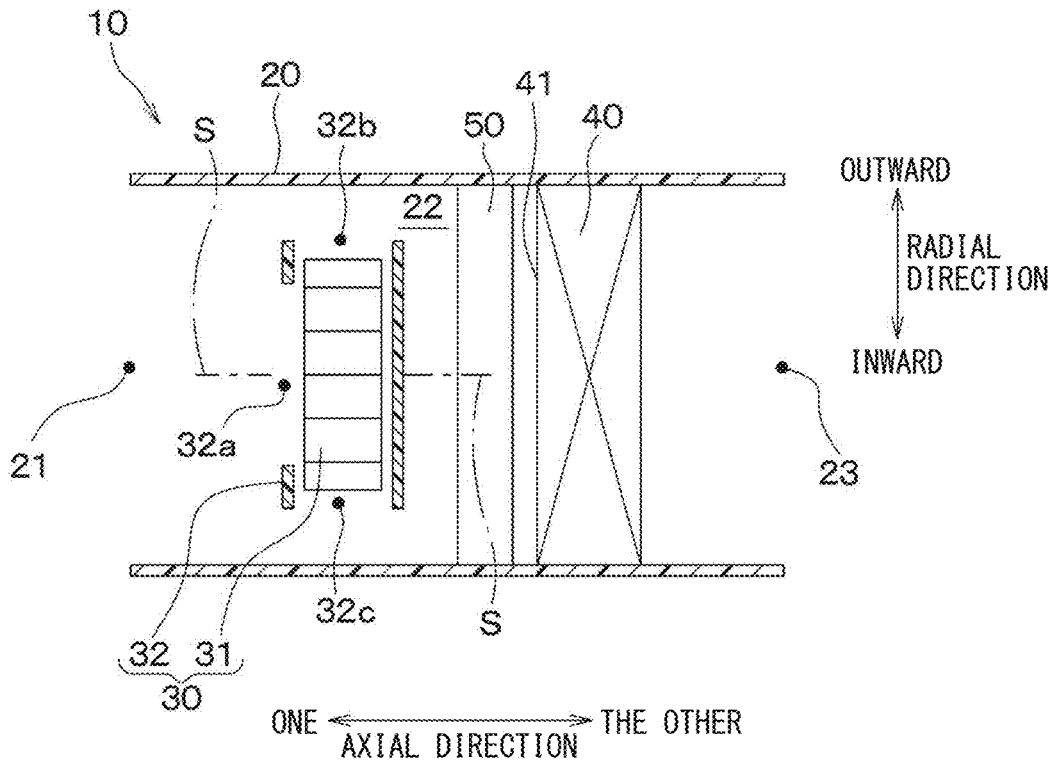
FIG. 1 is a cross-sectional view illustrating a cross-sectional configuration of an interior air conditioning unit according to a first embodiment.

To begin with, examples of relevant techniques will be described. A vehicle air conditioner of a comparative example includes a centrifugal fan and a cooling heat exchanger disposed in a casing. In the vehicle air conditioner, the centrifugal fan sucks an air from one side of the vehicle air conditioner in an axial direction and blows the air outward in a radial direction. The cooling heat exchanger is disposed between the centrifugal fan and the other side of the vehicle air conditioner in the axial direction. The cooling heat exchanger cools the air blown from the centrifugal fan by use of refrigerant. Therefore, cool air can be blown from the cooling heat exchanger.

The present inventor has studied a wind speed distribution of the air blown from the centrifugal fan in the vehicle air conditioner of the comparative example described above.

A part of the air blown from the centrifugal fan flows into an edge area of an air inflow surface of the cooling heat exchanger. Another part of the air blown from the centrifugal fan and excluding the air flowing into the edge area of the air inflow surface flows into a central area of the air inflow surface of the cooling heat exchanger.

Hereinafter, for convenience of description, a flow of the part of the air blown from the centrifugal fan through the edge area of the air inflow surface of the cooling heat exchanger is referred to as a first air flow. A flow of the other part of the air blown from the centrifugal fan through the central area of the air inflow surface of the cooling heat exchanger is referred to as a second air flow.

According to the study of the present inventor, the first air flow from the centrifugal fan is bent toward the other side of the vehicle air conditioner in the axial direction, and then directly toward the other side in the axial direction. The second air flow from the centrifugal fan is bent toward the other side in the axial direction, bent inward in the radial direction, further bent toward the other side in the axial direction, and then toward the other side in the axial direction.

Therefore, the first air flow from the centrifugal fan is bent only once, and then toward the other side in the axial direction. On the other hand, the second air flow from the centrifugal fan is bent three times, and then toward the other side in the axial direction.

Therefore, the second air flow has a pressure loss greater than that of the first air flow. Therefore, an air volume of the first air flow is greater than an air volume of the second air flow. This increases inequality in the wind speed distribution of the air blown from the centrifugal fan.

Such increase of inequality in the wind speed distribution of the air also can occur in a blower device in which the cooling heat exchanger is not disposed in the casing.

In contrast, according to the present disclosure, inequality in a wind speed distribution of an air blown from a centrifugal fan can be reduced.

According to an aspect of the present disclosure, a blower device includes a centrifugal blower, an air flow guide and a casing. The centrifugal blower includes a centrifugal fan that rotates about an axis, sucks air from one side of the blower device in an axial direction of the centrifugal fan, and blows the air outward in a radial direction of the centrifugal fan from a center located at the axis. The air flow guide is disposed between the centrifugal fan and the other side of the blower device in the axial direction. The casing accommodates the centrifugal fan and allows the air to flow as an air flow toward the other side in the axial direction. The air flow from the centrifugal fan includes a first air flow and a second air flow. The first air flow is from the centrifugal fan, bent toward the other side in the axial direction, and then toward the other side in the axial direction. The second air flow is from the centrifugal fan, bent toward the other side in the axial direction, and then bent inward in the radial direction. A first pressure loss is a pressure loss generated in the first air flow between the centrifugal fan and an end of the air flow guide facing the other side in the axial direction. A second pressure loss is a pressure loss generated in the second air flow between the centrifugal fan and the end of the air flow guide facing the other side in the axial direction. A first pressure loss ratio is a divided value obtained by dividing the second pressure loss by the first pressure loss. A third pressure loss is a pressure loss generated in the first air flow between the centrifugal fan and an end of the air flow guide facing the one side in the axial direction. A fourth pressure loss is a pressure loss generated in the second air flow between the centrifugal fan and the end of the air flow guide facing in the axial direction. A second pressure loss ratio is a divided value obtained by dividing the fourth pressure loss by the third pressure loss. The air flow guide makes the first pressure loss ratio smaller than the second pressure loss ratio.

Therefore, a difference between a wind speed of the first air flow and a wind speed of the second air flow can be made small as compared with a case where the air flow guide is not provided. Thus, it is possible to provide the blower device capable of reducing inequality in wind speed distribution of the air blown from the centrifugal fan.

Hereinafter, embodiments of the present disclosure will be described referring to drawings. Among the respective embodiments, parts that are the same as or equivalent to each other will be assigned the same reference numeral in the drawings for simplification of their explanations.

First Embodiment

Figure 2:
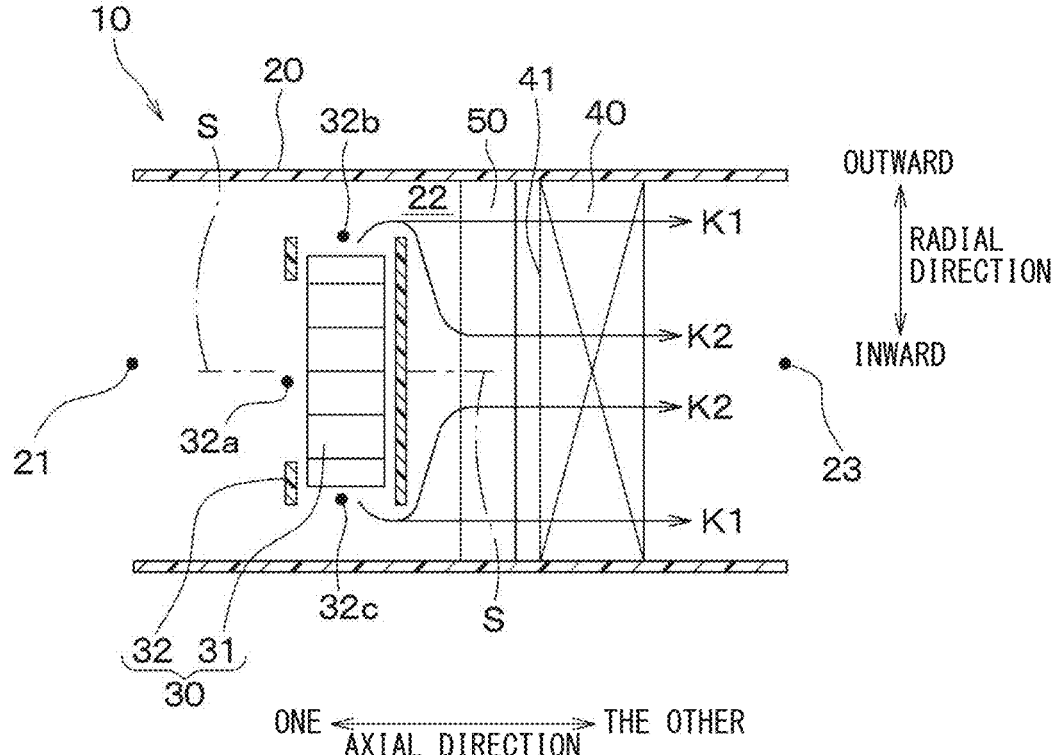
FIG. 2 is a cross-sectional view illustrating a flow of an air flow in the interior air conditioning unit according to the first embodiment of FIG. 1.

FIGS. 1 and 2 illustrate an overall configuration of an interior air conditioning unit 10 of a vehicle air conditioner according to the first embodiment. The interior air conditioning unit 10 of the present embodiment is disposed on a front side in a vehicle traveling direction with respect to an instrument panel in a vehicle interior.

The interior air conditioning unit 10 includes an air conditioning casing 20, a centrifugal blower 30, a cooling heat exchanger 40, and a filter 50. The air conditioning casing 20 is formed by a resin material, and an air inlet 21, an air flow passage 22, and an air outlet 23 are formed in the air conditioning casing 20.

The air inlet 21 causes an air flow to flow into the air flow passage 22 from the vehicle interior or the vehicle exterior. The air flow passage 22 causes the air flow to flow from the air inlet 21 toward the air outlet 23. The air outlet 23 causes the air flow from the air flow passage 22 to be blown to the vehicle interior.

The centrifugal blower 30 is disposed in the air conditioning casing 20. The centrifugal blower 30 includes a centrifugal fan 31 and a blower casing 32.

The centrifugal fan 31 rotates about an axis S, sucks the air flow from one side of the interior air conditioning unit 10 in an axial direction through an air inlet 32a of the blower casing 32, and blows the air flow outward in a radial direction centered on the axis S through air outlets 32b and 32c. The centrifugal fan 31 is rotationally driven by an electric motor (not illustrated).

The blower casing 32 is formed to cover both sides of the centrifugal fan 31 in the axial direction. In the present embodiment, the axial direction is a direction in which the axis S extends. The axial direction is parallel to a horizontal direction.

The blower casing 32 forms the air inlet 32a that opens toward the one side in the axial direction with respect to the centrifugal fan 31 and the air outlets 32b and 32c that open outward in the radial direction centered on the axis S with respect to the centrifugal fan 31. The air outlet 32b is disposed on the upper side of the vertical direction with respect to the centrifugal fan 31. The air outlet 32c is disposed on the lower side of the vertical direction with respect to the centrifugal fan 31.

The cooling heat exchanger 40 is disposed in the air conditioning casing 20. The cooling heat exchanger 40 is disposed between the centrifugal blower 30 and the other side of the interior air conditioning unit 10 in the axial direction. The cooling heat exchanger 40 has an air inflow surface 41 into which an air flow blown from the centrifugal fan 31 flows.

The air inflow surface 41 is formed so as to be orthogonal to the axial direction. The axis S is formed to penetrate the central side of the air inflow surface 41.

The cooling heat exchanger 40 makes a refrigeration cycle that circulates a refrigerant together with a compressor, a heat radiator, and a decompressor, and cools the air flow flowing into the air inflow surface 41 with the refrigerant. As a result, cold air is blown from the cooling heat exchanger 40.

The filter 50 is disposed between the centrifugal blower 30 and the cooling heat exchanger 40 in the air conditioning casing 20. The filter 50 filters the air flow blown from the centrifugal blower 30 toward the cooling heat exchanger 40 to remove dust or the like.

In the filter 50 of the present embodiment, a pressure loss is uniform over a plane direction orthogonal to the axial direction. As will be described later, the filter 50 has a function of equalizing the wind speed distribution of the air flow passing through the cooling heat exchanger.

Next, the operation of the interior air conditioning unit 10 of the present embodiment will be described.

First, the blower casing 32 rotates the centrifugal fan 31 about the axis S. Therefore, the centrifugal fan 31 sucks the air flow from the one side in the axial direction through the air inlet 32*a*, and blows the air flow outward in the radial direction centered on the axis S through the air outlets 32*b* and 32*c*.

As described above, the air flows blown from the air outlets 32*b* and 32*c* flow into the air inflow surface 41 of the cooling heat exchanger 40 through the filter 50. The cooling heat exchanger 40 cools the air flows flowing into the air inflow surface 41 with the refrigerant and blows out the cold air. The cold air is blown into the vehicle interior from the air outlet 23.

Here, the filter 50 has a function of equalizing the wind speed distribution of the air flow passing through the cooling heat exchanger 40. Hereinafter, details of equalization of the wind speed distribution by the filter 50 will be described with reference to FIGS. 2 and 3.

Figure 3:
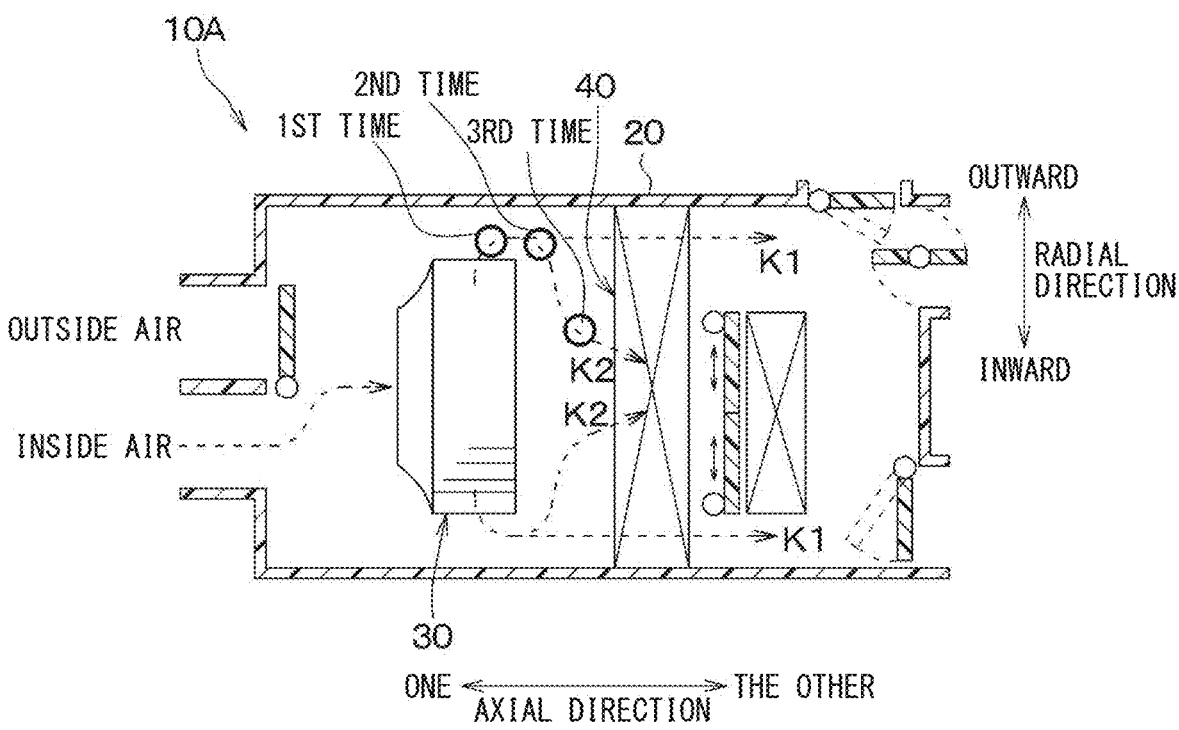
FIG. 3 is a cross-sectional view illustrating a cross-sectional configuration of an interior air conditioning unit according to a comparative example.

FIG. 2 illustrates a ventilation path of the air flow that passes through the filter 50 and the cooling heat exchanger 40 after the air flow is blown from the centrifugal fan 31 in the interior air conditioning unit 10 of the present embodiment. FIG. 3 illustrates a ventilation path of the air flow that passes through the cooling heat exchanger 40 after the air flow is blown from the centrifugal fan 31 in an interior air conditioning unit 10A of a comparative example. The interior air conditioning unit 10A of the comparative example has a configuration in which the filter 50 is removed from the interior air conditioning unit 10 of the present embodiment.

The air flow blown from the centrifugal fan 31 through the air outlets 32*b* and 32*c* includes an air flow K1 flowing into the central side of the air inflow surface 41 of the cooling heat exchanger 40 and an air flow K2 flowing into the central side of the air inflow surface 41 of the cooling heat exchanger 40.

The air flow K1 is a first air flow that is blown from the centrifugal fan 31 through the air outlets 32*b* and 32*c*, bent toward the other side in the axial direction, and then directly flows into the air inflow surface 41 of the cooling heat exchanger 40.

The air flow K2 is a second air flow that is blown from the centrifugal fan 31 through the air outlets 32*b* and 32*c*, bent toward the other side in the axial direction, bent inward in the radial direction, further bent toward the other side in the axial direction, and then flows into the air inflow surface 41 of the cooling heat exchanger 40.

Therefore, after being blown from the centrifugal fan 31, the air flow K1 is bent only once, and flows into the air inflow surface 41 of the cooling heat exchanger 40. On the other hand, after being blown from the centrifugal fan 31, the second air flow K2 is bent three times, and flows into the air inflow surface 41 of the cooling heat exchanger 40.

Here, a pressure loss generated each time the air flow K1 and the air flow K2 bend in the ventilation path is defined as R1. A pressure loss generated when the air flow K1 and the air flow K2 pass through the cooling heat exchanger 40 is defined as R2. A pressure loss generated when the air flow K1 and the air flow K2 pass through the filter 50 is defined as R3.

A pressure loss AG1 generated in the air flow K1 that is blown from the centrifugal fan 31 and passes through the cooling heat exchanger 40 in the interior air conditioning unit 10A of the comparative example in which the filter 50 is not provided as illustrated in FIG. 3 is represented by Equation 1.

$$AG1 = R1 + R2 \qquad \text{(Equation 1)}$$

A pressure loss AG2 generated in the air flow K2 that is blown from the centrifugal fan 31 and passes through the cooling heat exchanger 40 in the interior air conditioning unit 10A of the comparative example is represented by Equation 2.

$$AG2 = R1 \times 3 + R2 \qquad \text{(Equation 2)}$$

A pressure loss AS1 generated in the air flow K1 that is blown from the centrifugal fan 31 and passes through the cooling heat exchanger 40 in the interior air conditioning unit 10 of the present embodiment is represented by Equation 3.

$$AS1 = R1 + R2 + R3 \qquad \text{(Equation 3)}$$

A pressure loss AS2 generated in the air flow K2 that is blown from the centrifugal fan 31 and passes through the cooling heat exchanger 40 in the interior air conditioning unit 10 of the present embodiment is represented by Equation 4.

$$AS2 = R1 \times 3 + R2 + R3 \qquad \text{(Equation 4)}$$

In the interior air conditioning unit 10A of the comparative example, a pressure loss ratio AG2/AG1, which is obtained by dividing the pressure loss AG2 by the pressure loss AG1, is represented by Equation 5.

$$AG2/AG1 = (R1 \times 3 + R2)/(R1 + R2) \qquad \text{(Equation 5)}$$

In the interior air conditioning unit 10 of the present embodiment, a pressure loss ratio AS2/AS1, which is obtained by dividing the pressure loss AS2 by the pressure loss AS1, is represented by Equation 6.

$$AS2/AS1 = (R1 \times 3 + R2 + R3)/(R1 + R2 + R3) \quad \text{(Equation 6)}$$

Next, in order to compare the magnitude of (AG2/AG1) with the magnitude of (AS2/AS1), ΔA, which is a difference obtained by subtracting (AS2/AS1) from (AG2/AG1), is represented by Equation 7.

$$\Delta A = (R1 \times 3 + R2)/(R1 + R2) - \quad \text{(Equation 7)}$$
$$(R1 \times 3 + R2 + R3)/(R1 + R2 + R3) =$$
$$(2 \times R1 \times R3)/\{(R1 + R2)(R1 + R2 + R3)\}$$

Here, (2×R1×R3)>zero holds for (2×R1×R3) that is a numerator in Equation 7. Here, (R1+R2)(R1+R2+R3)>zero holds for (R1+R2)(R1+R2+R3) that is a numerator in Equation 7.

Therefore, (2×R1×R3)/{(R1+R2)(R1+R2+R3)}> zero is satisfied. Therefore, the difference ΔA obtained by subtracting (AS2/AS1) from (AG2/AG1) is greater than zero.

That is, AG2/AG1, which is the pressure loss ratio of the comparative example, is always greater than AS2/AS1, which is the pressure loss ratio of the present embodiment. That is, the pressure loss ratio AS2/AS1 of the present embodiment can be made smaller than the pressure loss ratio AG2/AG1 of the comparative example by the pressure loss R3 of the filter 50.

Such an effect of reducing the pressure loss ratio of the present embodiment is more effective as the pressure loss R3 of the filter 50 is greater.

As described above, the pressure loss ratio of the present embodiment can be made smaller than the pressure loss ratio of the comparative example.

Furthermore, in the present embodiment, a pressure loss generated in the air flow K1 between the centrifugal fan 31 and an end of the filter 50 facing the other side of the interior air conditioning unit 10 in the axial direction is defined as a pressure loss XA1 (that is, a first pressure loss). The pressure loss XA1 is equal to (R1+R3).

In the present embodiment, a pressure loss generated in the air flow K2 between the centrifugal fan 31 and the end of the filter 50 facing the other side in the axial direction is defined as a pressure loss XA2 (that is, a second pressure loss). The pressure loss XA2 is equal to (R1×3+R3).

Here, a pressure loss ratio (XA2/XA1), which is the first pressure loss ratio obtained by dividing the pressure loss XA2 by the pressure loss XA1, is equal to (R1×3+R3)/(R1+R3).

Furthermore, in the present embodiment, a pressure loss generated in the air flow K1 between the centrifugal fan 31 and an end of the filter 50 facing the one side of the interior air conditioning unit 10 in the axial direction is defined as a pressure loss XB1 (that is, a third pressure loss). The pressure loss XB1 is equal to R1.

In the present embodiment, a pressure loss generated in the air flow K2 between the centrifugal fan 31 and the end of the filter 50 facing the one side in the axial direction is defined as a pressure loss XB2 (that is, a fourth pressure loss). The pressure loss XB2 is equal to (R1×3).

Here, a pressure loss ratio (XB2/XB1), which is the second pressure loss obtained by dividing the pressure loss XB2 by the pressure loss XB1, is equal to (R1×3)/(R1).

Furthermore, in the present embodiment, (R1×3+R3)/(R1+R3) is made smaller than (R1×3)/(R1) by the pressure loss R3 of the filter 50. Therefore, the pressure loss ratio (XA2/XA1) is smaller than the pressure loss ratio (XB2/XB1).

In the present embodiment described above, the interior air conditioning unit 10 includes the centrifugal blower 30 including the centrifugal fan 31 that rotates about the axis S to suck the air flow from the one side in the axial direction and blow the air flow outward in the radial direction centered on the axis.

The interior air conditioning unit 10 includes the filter 50 as an air flow guide disposed between the centrifugal fan 31 and the other side in the axial direction, and an air conditioning casing 20 that accommodates the centrifugal fan 31 and the filter 50 and allows the air to flow as an air flow toward the other side in the axial direction. The air flow from the centrifugal fan 31 includes the air flow K1 and the air flow K2.

The air flow K1 is the first air flow that is from the centrifugal fan 31, bent toward the other side in the axial direction, and then toward the other side in the axial direction. The air flow K2 is the second air flow that is from the centrifugal fan 31, bent toward the other side in the axial direction, bent inward in the radial direction, further bent toward the other side in the axial direction, and then flows toward the other side in the axial direction.

A pressure loss generated in the air flow K1 between the centrifugal fan 31 and the end of the filter 50 facing the other side in the axial direction is defined as a pressure loss YA1.

A pressure loss generated in the air flow K2 between the centrifugal fan 31 and the end of the filter 50 facing the other side in the axial direction is defined as a pressure loss YA2.

A divided value obtained by dividing the pressure loss YA2 by the pressure loss YA1 is defined as a pressure loss ratio (YA2/YA1).

A pressure loss generated in the air flow K1 between the centrifugal fan 31 and the end of the filter 50 facing the one side in the axial direction is defined as a pressure loss YB1.

A pressure loss generated in the air flow K2 between the centrifugal fan 31 and the end of the filter 50 facing the one side in the axial direction is defined as a pressure loss YB2.

In the present embodiment, a divided value obtained by dividing the pressure loss YB2 by the pressure loss YB1 is defined as a pressure loss ratio (YB2/YB1). The pressure loss R3 of the filter 50 makes the pressure loss ratio (YA2/YA1) smaller than the pressure loss ratio (YB2/YB1).

Therefore, the difference between the wind speed of the air flow K2 and the wind speed of the air flow K1 can be reduced as compared with the case of the interior air conditioning unit 10A not provided with the filter 50. Accordingly, the filter 50 can reduce inequality in the wind speed distribution of the air blown from the centrifugal fan 31. Therefore, it is possible to reduce inequality in the wind speed distribution of the air flowing through the cooling heat exchanger 40.

Furthermore, the pressure loss ratio (AS2/AS1) of the interior air conditioning unit 10 of the present embodiment including the filter 50 is smaller than the pressure loss ratio (AG2/AG1) of the interior air conditioning unit 10A of the comparative example not provided with the filter 50.

Therefore, since the filter 50 generates the pressure loss R3 in each of the air flow K1 and the air flow K2 by filtering the air flow K1 and air flow K2 blown from the centrifugal fan 31, the pressure loss ratio (AS2/AS1) becomes smaller than the pressure loss ratio (AG2/AG1) of the comparative example.

Accordingly, increase of inequality in the wind speed distribution of the air blown from the centrifugal fan 31 can be reduced as compared with the comparative example. Therefore, it is possible to reduce inequality in the wind speed distribution of the air flowing through the cooling heat exchanger 40 as compared with the comparative example.

Second Embodiment

Figure 4:
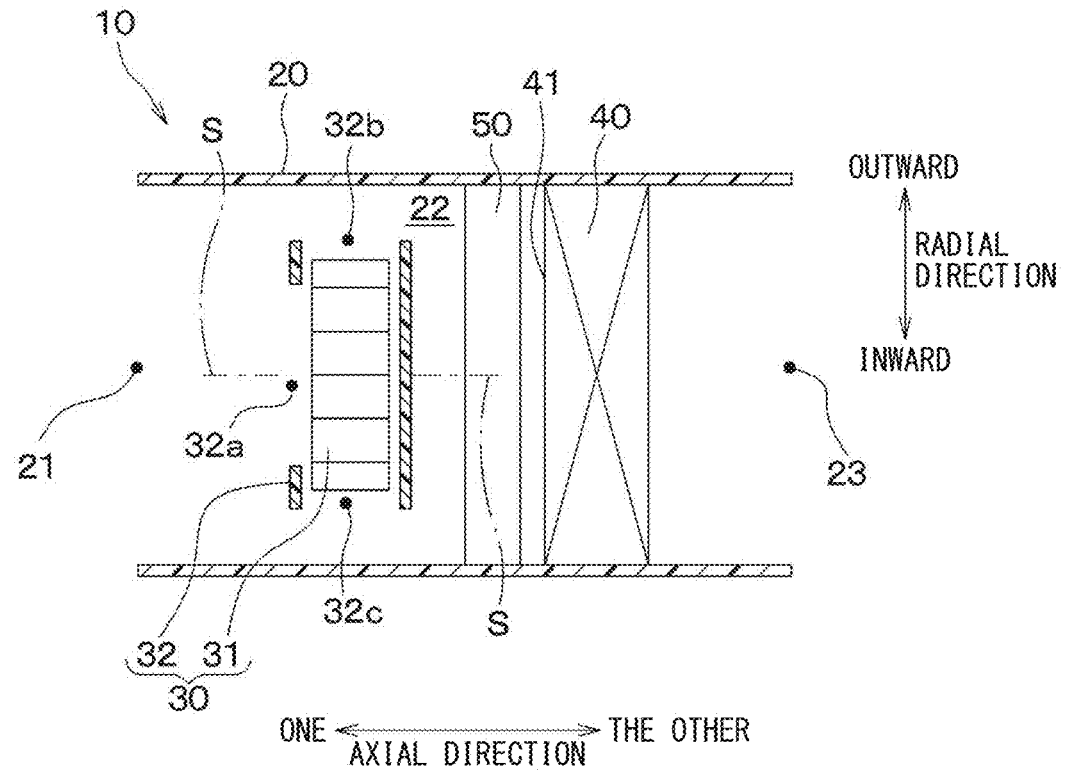
FIG. 4 is a cross-sectional view illustrating a cross-sectional configuration of an interior air conditioning unit according to a second embodiment.
Figure 5:
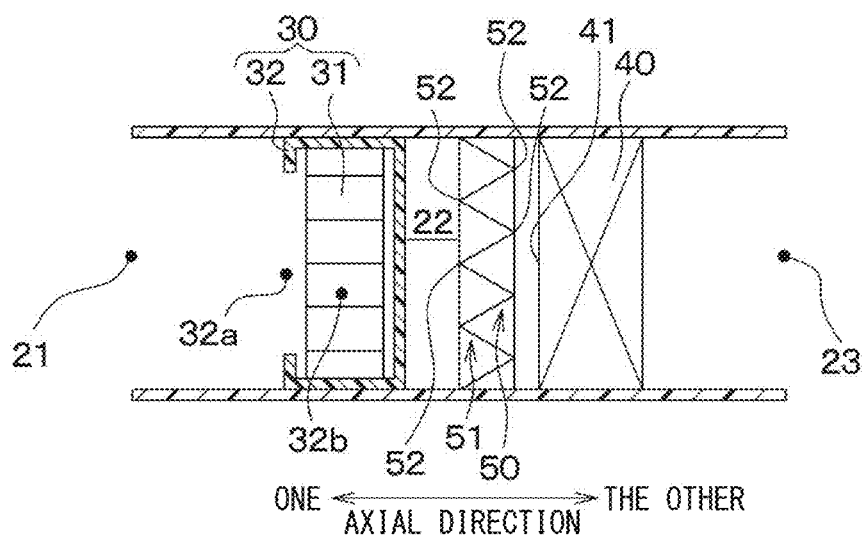
FIG. 5 is a view of an internal configuration of the interior air conditioning unit according to the second embodiment of FIG. 4 as viewed from an upper side in a vertical direction.
Figure 6:
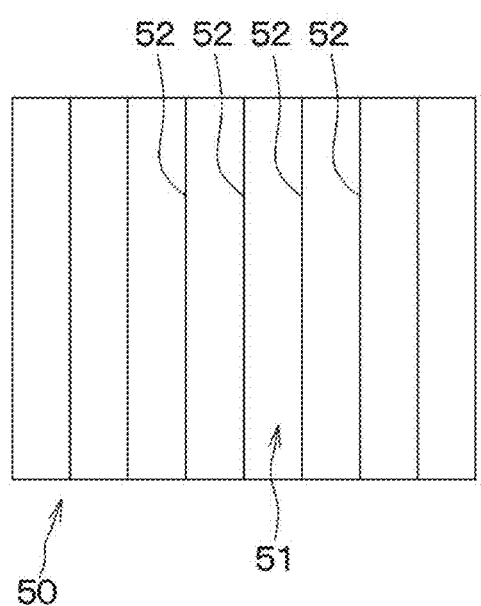
FIG. 6 is a front view of a filter of the interior air conditioning unit according to the second embodiment of FIG. 4 as viewed from one side in an axial direction.

In the second embodiment, an example in which the interior air conditioning unit 10 of the first embodiment includes a filter 50 using a filter medium 51 formed in a wave shape will be described with reference to FIGS. 4, 5, and 6. In FIGS. 4, 5, and 6, the same reference numerals as those in FIG. 1 denote the same components, and the description thereof will be omitted.

The interior air conditioning unit 10 of the present embodiment is different from the interior air conditioning unit 10 of the first embodiment only in including the filter 50, and thus the filter 50 of the present embodiment will be mainly described below.

The filter 50 of the present embodiment includes a filter medium 51 that is formed in a film shape and filters the air flow K1 and the air flow K2. The filter medium 51 is formed in a wave shape having folds 52 extending in the radial direction from the center located at the axis S.

An extending direction in which the folds 52 extend is a vertical direction, and the extending direction is the same as the radial direction in which the air flow K2 is bent for the second time (that is, a direction bending at the second step). Therefore, the pressure loss generated by the filter 50 is equal in the vertical direction.

According to the present embodiment described above, when the air flow K2 passes through the filter medium 51, the folds 52 of the filter medium 51 do not prevent the air flow K2 from being bent inward in the radial direction with respect to the axis for the second time, and thus the air flow K2 can smoothly pass through the filter medium 51.

Furthermore, the air flow blown from the centrifugal fan 31 flows toward the other side in the axial direction as a swirl flow in the air flow passage 22 of the air conditioning casing 20. On the other hand, the filter medium 51 includes the folds 52 extending in the same direction as the radial direction centered on the axis S. Therefore, the folds 52 can cancel the flow of the swirling flow.

Third Embodiment

Figure 7:
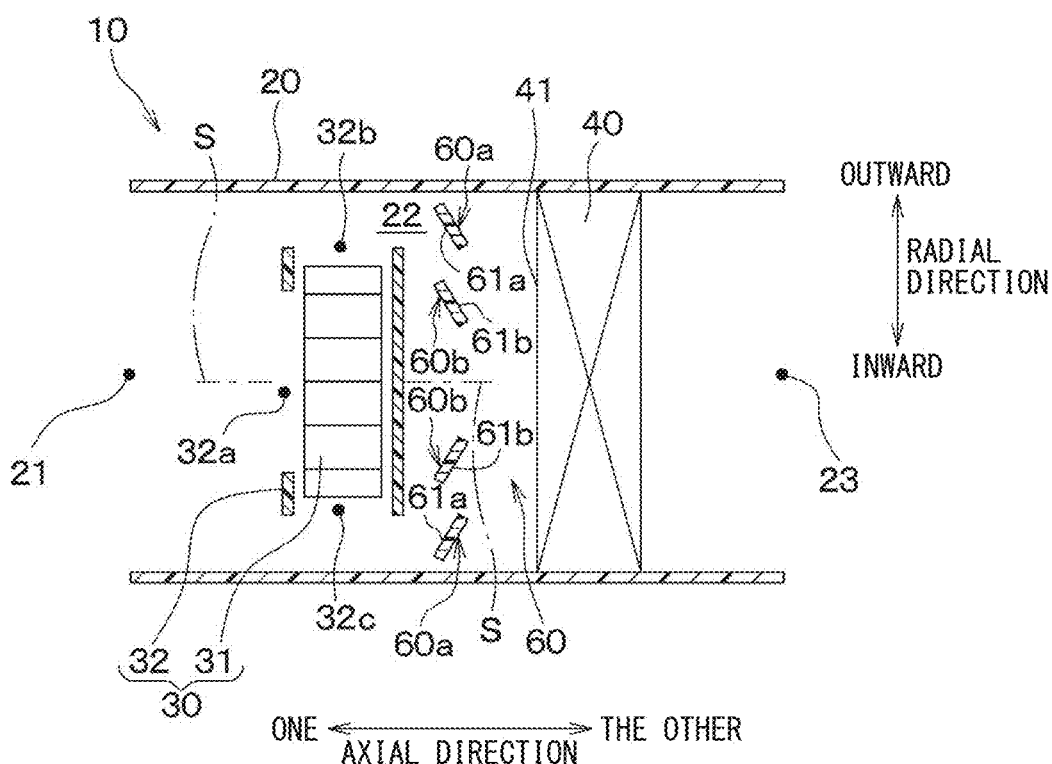
FIG. 7 is a cross-sectional view illustrating a cross-sectional configuration of an interior air conditioning unit according to a third embodiment.

In the first embodiment, the example in which the filter 50 is used as the air flow guide has been described, but instead of this, the third embodiment in which a guide 60 is used as the air flow guide will be described with reference to FIGS. 7, 8, and 9.

An interior air conditioning unit 10 of the present embodiment uses the guide 60 instead of the filter 50 of the interior air conditioning unit 10 of the first embodiment. In FIG. 7, the same reference numerals as those in FIG. 1 denote the same components, and the description thereof will be omitted.

In the interior air conditioning unit 10 of the present embodiment, the guide 60 is provided between the centrifugal blower 30 and the cooling heat exchanger 40. The guide 60 includes two rib members 60a and two rib members 60b.

One rib member 60a of two rib members 60a is a plate member disposed on the upper side of the vertical direction in the air conditioning casing 20. The other rib member 60a other than one rib member 60a of two rib members 60a is a plate member disposed on the lower side of the vertical direction in the air conditioning casing 20. Hereinafter, one rib member 60a is referred to as an upper rib member 60a, and the other rib member 60a is referred to as a lower rib member 60a.

In the present embodiment, two rib members 60a and two rib members 60b are provided independently of the air conditioning casing 20.

Figure 8:
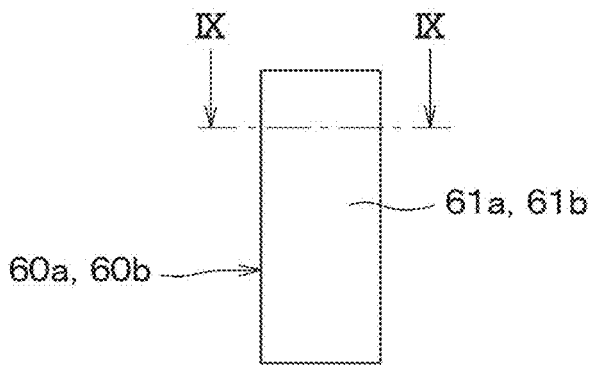
FIG. 8 is a view illustrating a plate surface of a rib member in the interior air conditioning unit according to the third embodiment of FIG. 7.
Figure 9:
FIG. 9 is a cross-sectional view taken along line IX-IX of FIG. 8.

As illustrated in FIGS. 8 and 9, the upper rib member 60a and the lower rib member 60a are each formed in a plate shape. The upper rib member 60a has a plate surface 61a extending in a direction intersecting a thickness direction.

The upper rib member 60a is disposed to have the plate surface 61a inclined with respect to the axis S. The upper rib member 60a is formed such that a distance between the plate surface 61a and the central axis S in the radial direction decreases in the axial direction from one side to the other side of the interior air conditioning unit 10.

The upper rib member 60a of the present embodiment is formed such that a height of the plate surface 61a in the vertical direction decreases in the axial direction from the one side to the other side. The upper rib member 60a guides, with the plate surface 61a of the upper rib member 60a, the air flow K1 from the air outlet 32b inward in the radial direction centered on the axis S.

Accordingly, the plate surface 61a of the upper rib member 60a obstructs the air flow K1 from the air outlet 32b toward the other side of the axial direction.

The lower rib member 60a is disposed to have the plate surface 61a inclined with respect to the axis S. The lower rib member 60a is formed such that a distance between the plate surface 61a and the central axis S in the radial direction decreases in the axial direction from one side to the other side.

The lower rib member 60a of the present embodiment is formed such that a height of the plate surface 61a in the vertical direction increases in the axial direction from one side to the other side. The lower rib member 60a guides, with the plate surface 61a of the lower rib member 60a, the air flow K1 from the air outlet 32c inward in the radial direction centered on the axis S.

Accordingly, the plate surface 61a of the lower rib member 60a obstructs the air flow K1 from the air outlet 32c toward the other side in the axial direction.

Two rib members 60b are disposed between the upper rib member 60a and the lower rib member 60a. One rib member 60b of two rib members 60b is a plate member disposed on the upper side of the vertical direction in the air conditioning casing 20. The other rib member 60b other than one rib member 60b of two rib members 60b is a plate member disposed on the lower side of the vertical direction in the air conditioning casing 20. Hereinafter, one rib member 60b is referred to as an upper rib member 60b, and the other rib member 60b is referred to as a lower rib member 60b.

As illustrated in FIGS. 8 and 9, the upper rib member 60b and the lower rib member 60b are each formed in a plate shape. The upper rib member 60b has a plate surface 61b extending in a direction intersecting a thickness direction.

The upper rib member 60b is disposed to have the plate surface 61b inclined with respect to the axis S. The upper rib member 60b is formed such that a distance between the plate surface 61b and the central axis S in the radial direction decreases in the axial direction from the one side to the other side.

The upper rib member 60b of the present embodiment is formed such that a height of the plate surface 61b in the vertical direction decreases in the axial direction from the one side to the other side. The upper rib member 60b guides, with the plate surface 61b of the upper rib member 60b, the air flow K1 from the air outlet 32b inward in the radial direction centered on the axis S (that is, downward in the vertical direction).

The lower rib member 60b is disposed to have the plate surface 61b inclined with respect to the axis S. The lower rib member 60b is formed such that a distance between the plate surface 61b and the central axis S in the radial direction decreases in the axial direction from the one side to the other side.

The lower rib member 60b of the present embodiment is formed such that a height of the plate surface 61b in the vertical direction increases in the axial direction from the one side to the other side. The lower rib member 60b guides, with the plate surface 61b of the lower rib member 60b, the air flow K1 from the air outlet 32c inward in the radial direction centered on the axis S (that is, upward in the vertical direction).

In the present embodiment described above, a pressure loss generated in the air flow K1 between the centrifugal fan 31 and an end of the upper rib member 60a facing the other side in the axial direction or between the centrifugal fan 31 and an end of the lower rib member 60a facing the other side in the axial direction is defined as a pressure loss YA1.

A pressure loss generated in the air flow K2 between the centrifugal fan 31 and an end of the upper rib member 60b facing the other side in the axial direction or between the centrifugal fan 31 and an end of the lower rib member 60b facing the other side in the axial direction is defined as a pressure loss YA2. A divided value obtained by dividing the pressure loss YA2 by the pressure loss YA1 is defined as a pressure loss ratio (YA2/YA1).

A pressure loss generated in the air flow K1 between the centrifugal fan 31 and an end of the upper rib member 60a facing the one side in the axial direction or between the centrifugal fan 31 and an end of the lower rib member 60a facing the one side in the axial direction is defined as a pressure loss YB1.

A pressure loss generated in the air flow K2 between the centrifugal fan 31 and an end of the upper rib member 60b facing the one side in the axial direction or between the centrifugal fan 31 and an end of the lower rib member 60b facing the one side in the axial direction is defined as a pressure loss YB2. In the present embodiment, a divided value obtained by dividing the pressure loss YA2 by the pressure loss YB1 is defined as a pressure loss ratio (YB2/YB1).

The guide 60 makes the pressure loss ratio (YA2/YA1) smaller than the pressure loss ratio (YB2/YB1).

Accordingly, the filter 50 can suppress the occurrence of deviation in the wind speed distribution of the air flow blown from the centrifugal fan 31. Therefore, it is possible to suppress the occurrence of deviation in the wind speed distribution of the air flow flowing through the cooling heat exchanger 40.

Furthermore, the pressure loss ratio (AS2/AS1) of the interior air conditioning unit 10 of the present embodiment including the guide 60 is smaller than the pressure loss ratio (AG2/AG1) of the interior air conditioning unit 10A of the comparative example not provided with the guide 60.

Accordingly, inequality in the wind speed distribution of the air blown from the centrifugal fan 31 can be reduced as compared with the comparative example. Therefore, it is possible to reduce the inequality in the wind speed distribution of the air flowing through the cooling heat exchanger 40 as compared with the comparative example.

Fourth Embodiment

Figure 10:
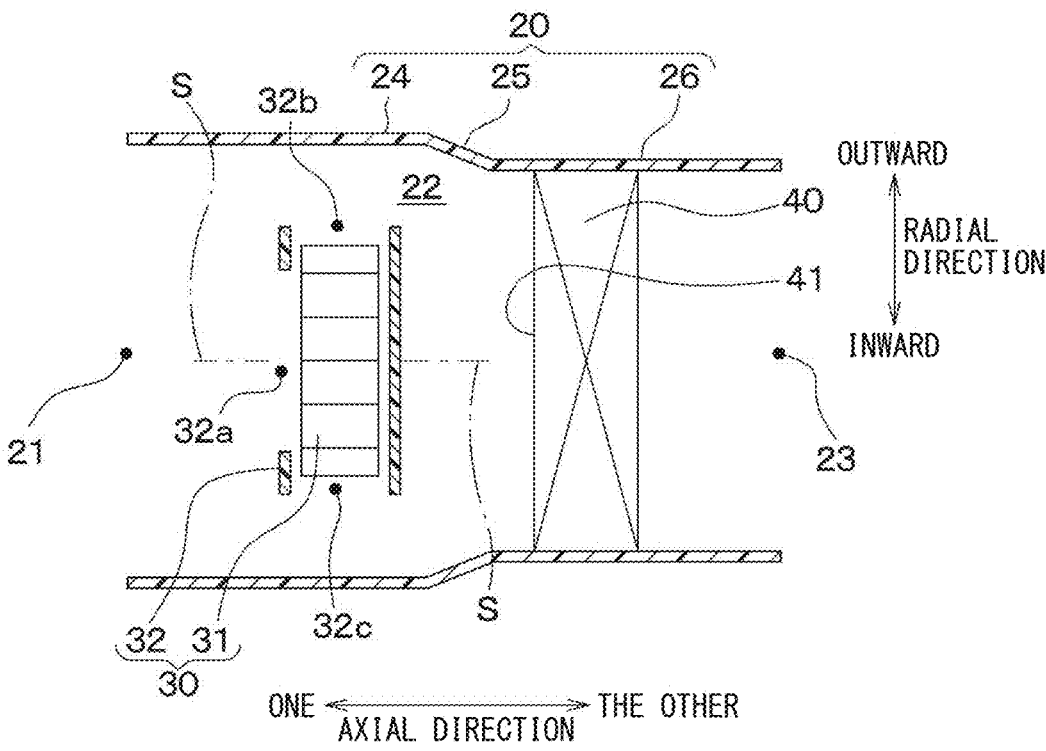
FIG. 10 is a cross-sectional view illustrating a cross-sectional configuration of an interior air conditioning unit according to a fourth embodiment.

In the first embodiment, the example in which the filter 50 is used as the air flow guide has been described, but instead of this, the fourth embodiment in which an air conditioning casing 20 is used as the air flow guide will be described with reference to FIG. 10. In FIG. 10, the same reference numerals as those in FIG. 1 denote the same components, and the description thereof will be omitted.

As illustrated in FIG. 10, the interior air conditioning unit 10 of the present embodiment includes an air conditioning casing 20 in which the filter 50 is removed and which replaces the air conditioning casing 20 of FIG. 1. The air conditioning casing 20 of the present embodiment includes an inlet-side casing 24, a guide casing 25, and an outlet-side casing 26.

The inlet-side casing 24 forms an air flow passage through which an air flow flows in the axial direction. The guide casing 25 forms an air flow passage through which the air flow flows in the axial direction. The guide casing 25 is disposed between the inlet-side casing 24 and the other side of the interior air conditioning unit 10 in the axial direction. The outlet-side casing 26 is disposed between the guide casing 25 and the other side in the axial direction. In the inlet-side casing 24, the guide casing 25, and the outlet-side casing 26, air flow passages are connected to each other to form an air flow passage 22.

The centrifugal blower 30 is disposed in the inlet-side casing 24. The cooling heat exchanger 40 is disposed in the outlet-side casing 26. The cross-sectional area of the air flow passage of the outlet-side casing 26 is smaller than the cross-sectional area of the air flow passage of the inlet-side casing 24. A distance between the guide casing 25 and the central axis S in the radial direction decreases in the axial direction from one side to the other side of the interior air conditioning unit 10 in the axial direction.

Therefore, the guide casing 25 obstructs the air flow K1 toward the other side of the axial direction by making the air flow K1 blown from the centrifugal fan 31 flow inward in the radial direction centered on the axis S.

The guide casing 25 is disposed between the centrifugal fan 31 and the other side in the axial direction. In the guide casing 25, a pressure loss is generated in the air flow K1 blown from the centrifugal fan 31. The guide casing 25 does not obstruct the air flow K2 blown from the centrifugal fan 31 toward the other side of the axial direction.

In the present embodiment described above, a pressure loss generated in the air flow K1 between the centrifugal fan 31 and an end of the guide casing 25 facing the other side in the axial direction is defined as a pressure loss YA1.

A pressure loss generated in the air flow K2 between the centrifugal fan 31 and the end of the guide casing 25 facing the other side in the axial direction is defined as a pressure loss YA2. In the present embodiment, a divided value obtained by dividing the pressure loss YA2 by the pressure loss YA1 is defined as a pressure loss ratio (YA2/YA1).

A pressure loss generated in the air flow K1 between the centrifugal fan 31 and an end of the guide casing 25 facing the one side in the axial direction is defined as a pressure loss YB1.

A pressure loss generated in the air flow K2 between the centrifugal fan 31 and the end of the guide casing 25 facing the one side in the axial direction is defined as a pressure loss YB2. In the present embodiment, a divided value obtained by dividing the pressure loss R2 by the pressure loss R1 is defined as a pressure loss ratio (YB2/YB1).

The guide casing 25 makes the pressure loss ratio (YA2/YA1) smaller than the pressure loss ratio (YB2/YB1).

Accordingly, the guide casing 25 can reduce inequality in the wind speed distribution of the air blown from the centrifugal fan 31. Therefore, it is possible to reduce inequality in the wind speed distribution of the air flowing through the cooling heat exchanger 40.

Furthermore, the pressure loss ratio (AS2/AS1) of the interior air conditioning unit 10 of the present embodiment including the guide casing 25 is smaller than the pressure loss ratio (AG2/AG1) of the interior air conditioning unit 10A of the comparative example not provided with the guide casing 25.

Accordingly, inequality in the wind speed distribution of the air blown from the centrifugal fan 31 can be reduced as compared with the comparative example. Therefore, it is possible to reduce inequality in the wind speed distribution of the air flow flowing through the cooling heat exchanger 40 as compared with the comparative example.

Fifth Embodiment

Figure 11:
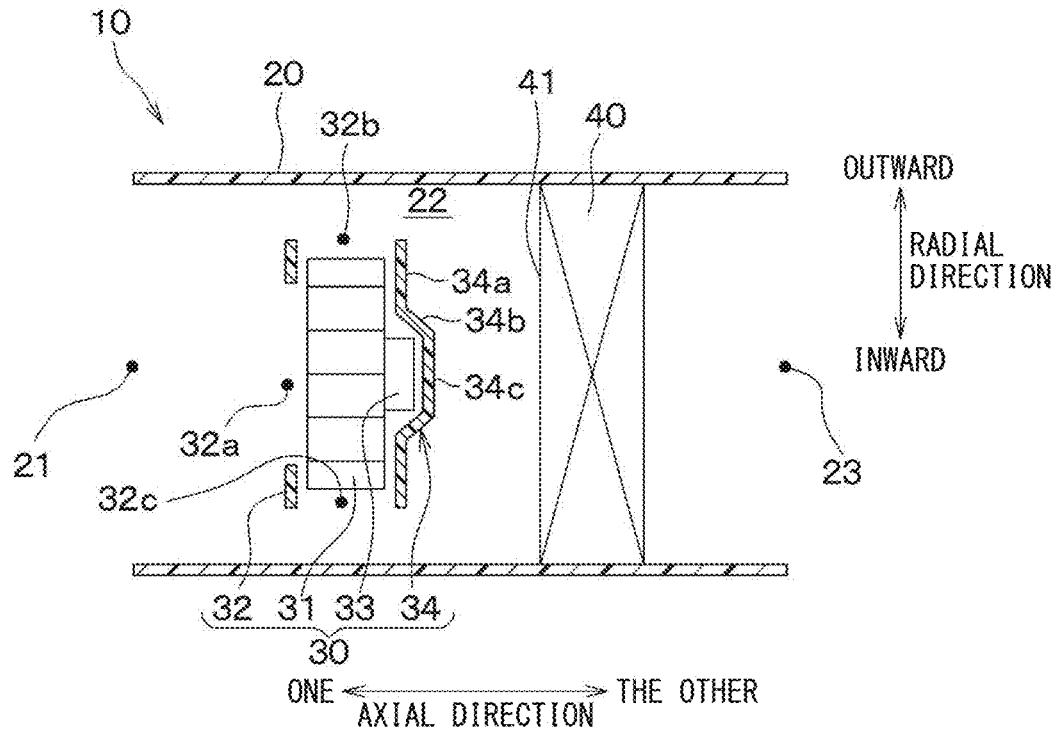
FIG. 11 is a cross-sectional view illustrating a cross-sectional configuration of an interior air conditioning unit according to a fifth embodiment.

In the fifth embodiment, an example in which the air flow K2 blown from the centrifugal fan 31 is guided inward in the radial direction centered on the axis S by a blower motor cover 34 by a Coanda effect in the first embodiment will be described with reference to FIG. 11. In FIG. 11, the same reference numerals as those in FIG. 1 denote the same components.

The present embodiment is mainly different from the first embodiment in the configuration of the centrifugal blower 30. Hereinafter, in the present embodiment, the configuration of the centrifugal blower 30 will be mainly described.

In the present embodiment, the centrifugal blower 30 includes a centrifugal fan 31, a blower casing 32, and an electric motor 33.

The centrifugal fan 31 rotates about an axis S, sucks the air flow from one side of an interior air conditioning unit 10 in the axial direction through an air inlet 32a of the blower casing 32, and blows the air flow outward in a radial direction centered on the axis S through air outlets 32b and 32c.

The centrifugal fan 31 is rotationally driven by the electric motor 33. The electric motor 33 is disposed on the other side of the axial direction with respect to the centrifugal fan 31.

The blower casing 32 is formed to cover both sides of the centrifugal fan 31 and both sides the electric motor 33 in the axial direction.

The blower casing 32 forms the air inlet 32a that is open toward the one side in the axial direction from the centrifugal fan 31, and the air outlets 32b and 32c that are open outward in the radial direction from the central axis S of the centrifugal fan 31. The air outlet 32b is disposed upward of the centrifugal fan 31 in the vertical direction. The air outlet 32c is disposed downward of the centrifugal fan 31 in the vertical direction.

In the present embodiment, the blower casing 32 includes the blower motor cover 34 disposed between the electric motor 33 and the other side in the axial direction to cover the electric motor 33. The blower motor cover 34 includes an outer diameter portion 34a, a guide portion 34b, and a central portion 34c.

The outer diameter portion 34a is disposed outward in the radial direction centered on the axis S. The outer diameter portion 34a is formed in an annular shape centered on the axis S. The central portion 34c is disposed inward of the outer diameter portion 34a in the radial direction centered on the axis S. The central portion 34c is formed in a disk shape centered on the axis S. The central portion 34c is disposed between the outer diameter portion 34a and the other side in the axial direction.

The guide portion 34b is disposed between the outer diameter portion 34a and the central portion 34c. A distance between the guide portion 34b and the central axis S in the radial direction decreases in the axial direction toward the other side.

The blower motor cover 34 of the present embodiment guides the air flow K2 blown from the centrifugal fan 31 inward in the radial direction centered on the axis S by a Coanda effect.

Next, the operation of the interior air conditioning unit 10 of the present embodiment will be described.

First, the blower casing 32 rotates the centrifugal fan 31 about the axis S. Therefore, the centrifugal fan 31 sucks the air flow from the one side in the axial direction through the air inlet 32a, and blows the air flow outward in the radial direction centered on the axis S through the air outlets 32b and 32c.

As described above, the air flow K1 and the air flow K2, which are blown from the air outlets 32b and 32c, flow into the air inflow surface 41 of the cooling heat exchanger 40. The cooling heat exchanger 40 cools, with the refrigerant, the air flow K1 and the air flow K2, which flow into the air inflow surface 41, and blows out the cold air.

Specifically, the air flow K1 from the centrifugal fan 31 through the air outlets 32b and 32c is bent toward the other side in the axial direction, and then directly into the air inflow surface 41 of the cooling heat exchanger 40. That is, the air flow K1 is not affected by the blower motor cover 34.

After being blown from the centrifugal fan 31 through the air outlets 32b and 32c, the air flow K2 is bent toward the other side in the axial direction, and then guided inward in the radial direction centered on the axis S along the blower motor cover 34 by a Coanda effect. Thereafter, after that, the air flow K2 is a second air flow that is bent toward the other side in the axial direction and flows into the air inflow surface 41 of the cooling heat exchanger.

In the present embodiment described above, a pressure loss generated in the air flow K1 between the centrifugal fan 31 and an end of the blower motor cover 34 facing the other side in the axial direction is defined as a pressure loss YA1.

A pressure loss generated in the air flow K2 between the centrifugal fan 31 and the end of the blower motor cover 34 facing the other side in the axial direction is defined as a pressure loss YA2. In the present embodiment, a divided value obtained by dividing the pressure loss YA2 by the pressure loss YA1 is defined as a pressure loss ratio (YA2/YA1).

A pressure loss generated in the air flow K1 between the centrifugal fan 31 and an end of the blower motor cover 34 facing the one side in the axial direction is defined as a pressure loss YB1.

A pressure loss generated in the air flow K2 between the centrifugal fan 31 and the end of the blower motor cover 34 facing the one side in the axial direction is defined as a pressure loss YB2. Here, the pressure loss YA2 is smaller than the pressure loss YB2 due to a Coanda effect. In the present embodiment, a divided value obtained by dividing the pressure loss YB2 by the pressure loss YB1 is defined as a pressure loss ratio (YB2/YB1).

The blower motor cover 34 makes the pressure loss ratio (YA2/YA1) smaller than the pressure loss ratio (YB2/YB1).

Accordingly, the guide casing 25 can reduce inequality in the wind speed distribution of the air flow blown from the centrifugal fan 31. Therefore, it is possible to reduce inequality in the wind speed distribution of the air flow flowing through the cooling heat exchanger 40.

Furthermore, the pressure loss ratio (AS2/AS1) of the interior air conditioning unit 10 of the present embodiment including the guide casing 25 is smaller than the pressure loss ratio (AG2/AG1) of the interior air conditioning unit 10A of the comparative example not provided with the blower motor cover 34.

Accordingly, inequality in the wind speed distribution of the air flow blown from the centrifugal fan 31 can be reduced as compared with the comparative example. Therefore, it is possible to reduce inequality in the wind speed distribution of the air flow flowing through the cooling heat exchanger 40 as compared with the comparative example.

Sixth Embodiment

Figure 12:
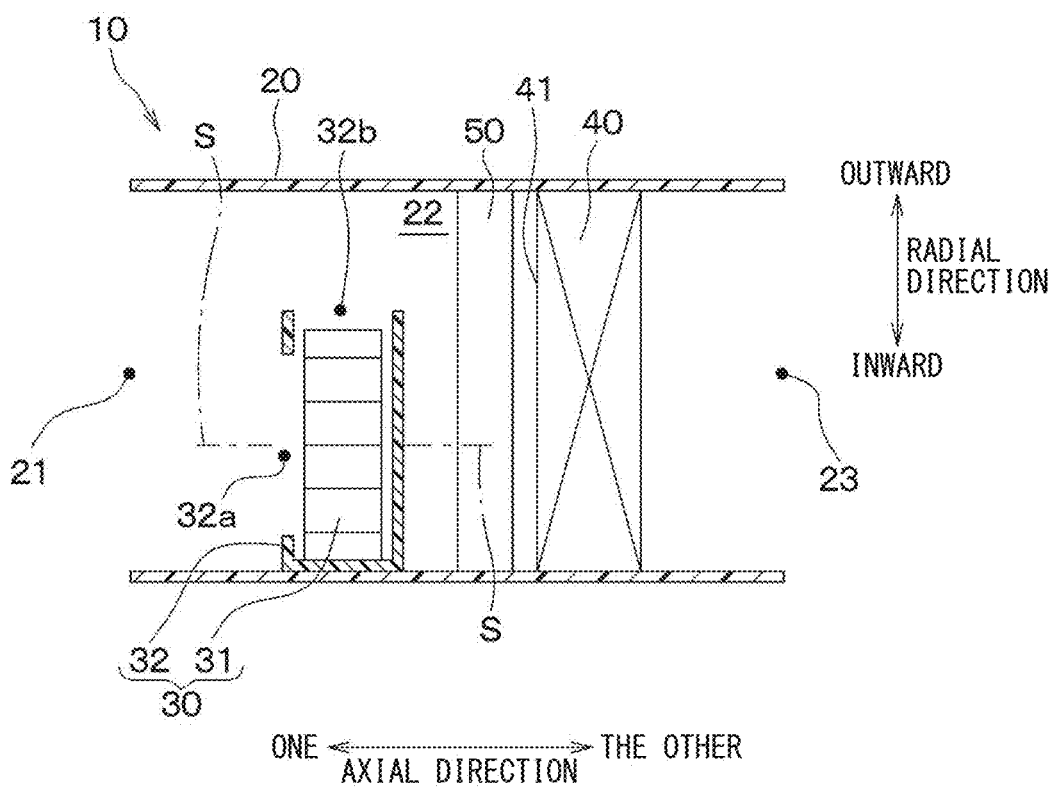
FIG. 12 is a cross-sectional view illustrating a cross-sectional configuration of an interior air conditioning unit according to a sixth embodiment.
Figure 13:
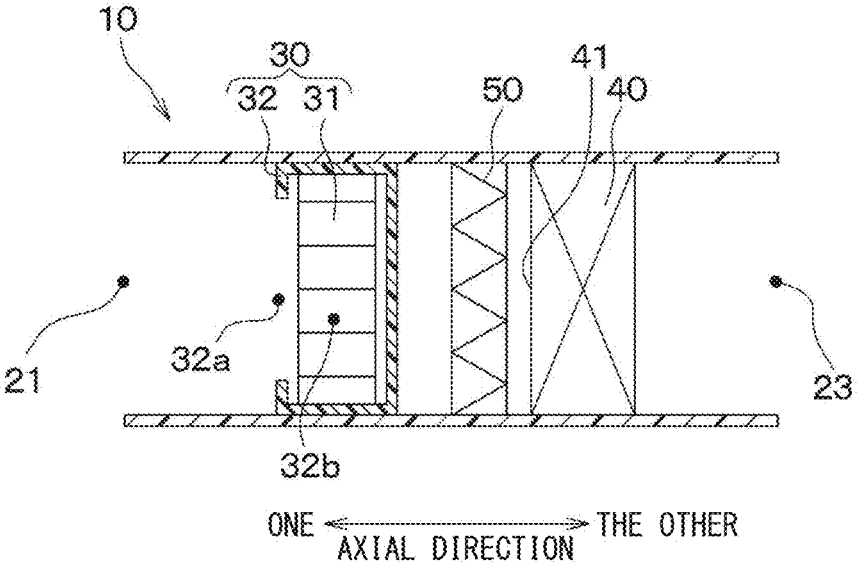
FIG. 13 is a view of an internal configuration of the interior air conditioning unit according to the sixth embodiment of FIG. 12 as viewed from an upper side in a vertical direction.

In the first embodiment, the example of using the centrifugal blower 30 including two air outlets 32*b* and 32*c* has been described, but instead of this, an example of using a centrifugal blower 30 including one air outlet 32*b* will be described with reference to FIGS. 12 and 13.

The present embodiment is mainly different from the first embodiment in the configuration of the centrifugal blower 30. Hereinafter, in the present embodiment, the configuration of the centrifugal blower 30 will be mainly described.

In the present embodiment, the centrifugal blower 30 includes a centrifugal fan 31 and a blower casing 32. The blower casing 32 forms an air inlet 32*a* that is open toward one side of an interior air conditioning unit 10 in the axial direction from the centrifugal fan 31, and an air outlet 32*b* that is open outward in the radial direction centered on the axis S (that is, upward in the vertical direction) from the centrifugal fan 31. The centrifugal blower 30 is disposed on the lower side of the vertical direction.

Seventh Embodiment

Figure 14:
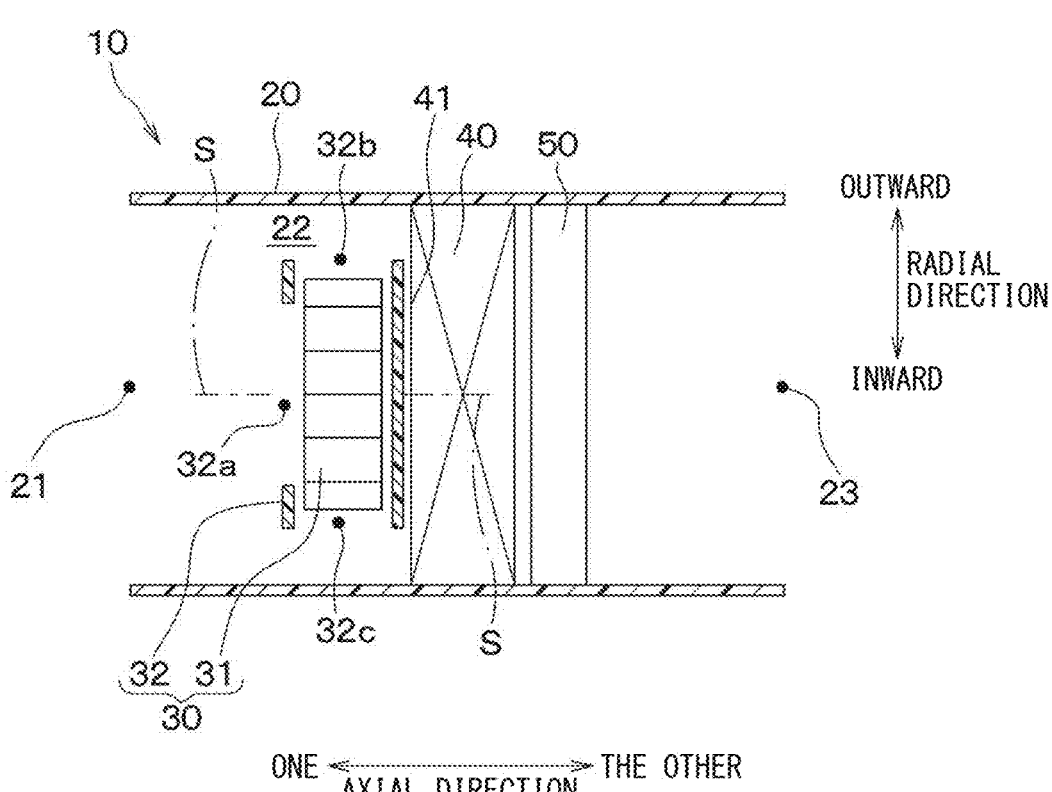
FIG. 14 is a cross-sectional view illustrating a cross-sectional configuration of an interior air conditioning unit according to a seventh embodiment.

In the first embodiment, the example in which the filter 50 is disposed on an air flow upstream side with respect to the cooling heat exchanger 40 has been described, but the present disclosure is not limited thereto, and the filter 50 may be disposed on an air flow downstream side with respect to the cooling heat exchanger 40 as in the seventh embodiment illustrated in FIG. 14.

In the present embodiment, the filter 50 is disposed on the other side of the axial direction with respect to the cooling heat exchanger 40.

In the present embodiment and the first embodiment, only the arrangement of the filter 50 and the cooling heat exchanger 40 is different, and the other configurations are the same, and thus the description thereof will be omitted.

Other Embodiments (1) In the first to seventh embodiments, the example in which a blower device of the present disclosure is applied to the interior air conditioning unit 10 has been described, but the present disclosure is not limited thereto, and the blower device of the present disclosure may be applied to a device other than the interior air conditioning unit 10.

(2) In the first to seventh embodiments, the example in which the interior air conditioning unit 10 including the cooling heat exchanger 40 is the blower device of the present disclosure has been described, but the present disclosure is not limited thereto, and the interior air conditioning unit 10 without the cooling heat exchanger 40 may be the blower device of the present disclosure.

(3) In the third to fifth embodiments, the example in which the interior air conditioning unit 10 without the filter 50 is the blower device of the present disclosure has been described, but instead of this, the interior air conditioning unit 10 including the filter 50 may be the blower device of the present disclosure.

(4) In the first embodiment, the example in which the filter 50 having the same pressure loss in the plane direction orthogonal to the axial direction is used has been described. However, the filter 50 in which the pressure loss is great in a region on the outer side in the radial direction centered on the axis S and the pressure loss is small in a region on the inner side in the radial direction centered on the axis S may be used.

(5) In the first embodiment, the example in which the filter 50 having the same pressure loss in the vertical direction is used has been described. However, the filter 50 in which the pressure loss is great in a region on the outer side in the radial direction centered on the axis S and the pressure loss is small in a region on the inner side in the radial direction centered on the axis S may be used.

(6) Note that the present disclosure is not limited to the above-described embodiments, and can be appropriately changed. In addition, the above-described embodiments are not unrelated to each other, and can be appropriately combined unless the combination is obviously impossible. In addition, in the above-described embodiments, it goes without saying that the elements constituting the embodiments are not necessarily essential except for a case where it is explicitly stated that the elements are particularly essential and a case where the elements are considered to be obviously essential in principle. In addition, in the above-described embodiments, a numerical value of the constituent element of the embodiment is not limited to a specific number except for a case where the numerical value such as the number of the constituent elements, a numerical value of the constituent element, the amount of the constituent elements, or a range of the constituent element is mentioned, a case where it is explicitly stated that the constituent element is particularly essential, and a case where the element is considered to be obviously essential in principle. In addition, in the above-described embodiments, when the shapes, a positional relationship, and the like of the constituent elements and the like are mentioned, the shapes, the positional relationship, and the like of the constituent elements are not limited except for a case where the shapes, the positional relationship, and the like are explicitly stated and a case where the shapes, the positional relationship, and the like are limited to specific shapes, a positional relationship, and the like in principle. In addition, in the above-described embodiments, in a case where it is described that the external environmental information of a vehicle (for example, humidity outside the vehicle) is acquired from a sensor, it is also possible to receive the external environmental information from a server or a cloud outside the vehicle without using the sensor. Alternatively, it is also possible to acquire related information related to the external environmental information from the server or the cloud outside the vehicle without using the sensor, and estimate the external environmental information based on the acquired related information.

The first to seventh embodiments and other embodiments configured as described above may configure an additional viewpoint idea as below.

(Additional Viewpoint Idea 1)

A blower device includes a centrifugal blower (30) including a centrifugal fan (31) that rotates about an axis(S)

to suck air from one side of the blower device in an axial direction and blow the air outward in a radial direction from a center located at the axis.

The blower device includes an air flow guide (50, 60, 34, 24) disposed between the centrifugal fan and the other side of the blower device in the axial direction.

The blower device includes a casing (20) that accommodates the centrifugal fan and the air flow guide and allows air to flow as an air flow toward the other side in the axial direction.

The air flow from the centrifugal fan includes a first air flow (K1) that is from the centrifugal fan, bent toward the other side in the axial direction, and then toward the other side in the axial direction.

The air flow from the centrifugal fan includes a second air flow (K2) that is from the centrifugal fan, bent toward the other side in the axial direction, and then bent inward in the radial direction.

A pressure loss generated in the first air flow between the centrifugal fan and an end of the air flow guide facing the other side in the axial direction is defined as a first pressure loss.

A pressure loss generated in the second air flow between the centrifugal fan and an end of the air flow guide facing the other side in the axial direction is defined as a second pressure loss.

A divided value obtained by dividing the second pressure loss by the first pressure loss is defined as a pressure loss ratio.

The air flow guide makes a pressure loss ratio smaller than a pressure loss ratio of a blower device without the air flow guide.

(Additional Viewpoint Idea 2)

A blower device includes a centrifugal blower (30) including a centrifugal fan (31) that rotates about an axis(S) to suck air from one side of the blower device in an axial direction and blow the air outward in a radial direction from a center located at the axis.

The blower device includes a filter (50) disposed between the centrifugal fan and the other side of the other side of the blower device in the axial direction, and a casing (20) that accommodates the centrifugal fan and the filter and allows the air to flow as an air flow toward the other side in the axial direction.

The air flow from the centrifugal fan includes a first air flow (K1) that is from the centrifugal fan, bent toward the other side in the axial direction, and then toward the other side in the axial direction.

The air flow from the centrifugal fan includes a second air flow (K2) that is from the centrifugal fan, bent toward the other side in the axial direction, and then bent inward in the radial direction.

The filter filters the first air flow and the second air flow to generate a pressure loss equal to a third pressure loss (R3) in each of the first air flow and the second air flow.

(Additional Viewpoint Idea 3)

A blower device includes a centrifugal blower (30) including a centrifugal fan (31) that rotates about an axis(S) to suck air from one side of the blower device in an axial direction and blow the air outward in a radial direction from a center located at the axis.

The blower device includes a filter (50) disposed between the centrifugal fan and the other side in the axial direction, and a casing (20) that accommodates the centrifugal fan and the air flow guide and allows the air to flow as an air flow toward the other side in the axial direction.

The air flow from the centrifugal fan includes a first air flow (K1) that is from the centrifugal fan, bent toward the other side in the axial direction, and then toward the other side in the axial direction.

The air flow blown from the centrifugal fan includes a second air flow (K2) that is from the centrifugal fan, bent toward the other side in the axial direction, and then bent inward in the radial direction.

The centrifugal blower includes a blower motor (33) that is disposed between the centrifugal fan and the other side of the blower device in the axial direction and rotates the centrifugal fan, and a blower motor cover (34) disposed between the blower motor and the other side in the axial direction to cover the blower motor.

The blower motor cover (34) guides the second air flow inward in the radial direction by the Coanda effect.

(Additional Viewpoint Idea 4)

A blower device includes a centrifugal blower (30) including a centrifugal fan (31) that rotates about an axis(S) to suck air from one side of the blower device in an axial direction and blow the air outward in a radial direction from a center located at the axis.

The blower includes an air flow guide (60) disposed between the centrifugal fan and the other side of the blower device in the axial direction, and a casing (20) that accommodates the centrifugal fan and the air flow guide and allows the air to flow as an air flow toward the other side in the axial direction.

The air flow from the centrifugal fan includes a first air flow (K1) that is from the centrifugal fan, bent toward the other side in the axial direction, and then toward the other side in the axial direction.

The air flow from the centrifugal fan includes a second air flow (K2) that is from the centrifugal fan, bent toward the other side in the axial direction, and then bent inward in the radial direction.

The air flow guide is a plate member including a plate surface (61a) that obstructs the first air flow toward the other side in the axial direction and generates a pressure loss in the first air flow.

(Additional Viewpoint Idea 5)

A blower device includes a centrifugal blower (30) including a centrifugal fan (31) that rotates about an axis(S) to suck air from one side of the blower device in an axial direction and blow the air outward in a radial direction from a center located at the axis.

The blower device includes an air flow guide (24) disposed between the centrifugal fan and the other side of the blower device in the axial direction, and a casing (20) that accommodates the centrifugal fan and allows the air to flow as an air flow toward the other side in the axial direction.

The air flow from the centrifugal fan includes a first air flow (K1) that is from the centrifugal fan, bent toward the other side in the axial direction, and then toward the other side in the axial direction.

The air flow from the centrifugal fan includes a second air flow (K2) that is from the centrifugal fan, bent toward the other side in the axial direction, and then bent inward in the radial direction.

The air flow guide is a plate member including a plate surface (61a) that obstructs the first air flow toward the other side in the axial direction and generates a pressure loss in the first air flow.

The casing forms the air flow guide (24) that obstructs the first air flow toward the other side in the axial direction and generates a pressure loss in the first air flow.

Overview

According to a first aspect described in a part or whole of the first to seventh embodiments and the other embodiments, the blower device includes a centrifugal blower. The centrifugal blower (30) includes a centrifugal fan (32) that rotates about an axis (S), sucks air from one side of the blower device in an axial direction of the centrifugal fan, and blows the air outward in a radial direction of the centrifugal fan from a center located at the axis.

The blower device includes an air flow guide (50, 60, 34, 24) disposed between the centrifugal fan and the other side of the blower device in the axial direction, and a casing (20) accommodating the centrifugal fan and allowing the air to flow as an air flow toward the other side in the axial direction.

The air flow from the centrifugal fan includes a first air flow and a second air flow. The first air flow (K1) is from the centrifugal fan, bent toward the other side in the axial direction, and then toward the other side in the axial direction. The second air flow (K2) is from the centrifugal fan, bent toward the other side in the axial direction, and then bent inward in the radial direction.

A first pressure loss is a pressure loss generated in the first air flow between the centrifugal fan and an end of the air flow guide facing the other side in the axial direction.

A second pressure loss is a pressure loss generated in the second air flow between the centrifugal fan and the end of the air flow guide facing the other side in the axial direction.

A first pressure loss ratio is a divided value obtained by dividing the second pressure loss by the first pressure loss.

A third pressure loss is a pressure loss generated in the first air flow between the centrifugal fan and an end of the air flow guide facing the one side in the axial direction.

A fourth pressure loss is a pressure loss generated in the second air flow between the centrifugal fan and the end of the air flow guide facing in the axial direction.

A second pressure loss ratio is a divided value obtained by dividing the fourth pressure loss by the third pressure loss. The air flow guide makes the first pressure loss ratio smaller than the second pressure loss ratio.

According to a second aspect, the air flow guide is a filter (50) that filters the first air flow and the second air flow to generate a pressure loss equal to the third pressure loss (R3) in each of the first air flow and the second air flow.

According to a third aspect, the filter includes a filter medium (51) formed in a film shape and configured to filter the first air flow and the second air flow.

The filter medium is formed in a wave shape having folds (52) extending in a direction same as the radial direction.

According to a fourth aspect, the centrifugal blower includes a blower motor (33) disposed between the centrifugal fan and the other side in the axial direction and configured to rotate the centrifugal fan, and a blower motor cover (34) disposed between the blower motor and the other side in the axial direction and covering the blower motor. The blower motor cover (34) forms the air flow guide that guides the second air flow inward in the radial direction by a Coanda effect.

According to a fifth aspect, the air flow guide is a plate member including a plate surface (61a) configured to generate a pressure loss in the first air flow by obstructing the first air flow toward the other side in the axial direction.

According to a sixth aspect, the air flow guide is a plate member including a plate surface (61b) configured to guide the second air flow inward in the radial direction.

According to a seventh aspect, the casing forms the air flow guide (24) configured to generate a pressure loss in the first air flow by obstructing the first air flow toward the other side in the axial direction.

According to an eighth aspect, the blower device further includes a cooling heat exchanger (40) accommodated in the casing, disposed between the air flow guide and the other side in the axial direction, and configured to cool the first air flow and the second air flow that have passed through the air flow guide.

What is claimed is:

1. A blower device comprising:
a centrifugal blower including a centrifugal fan configured to rotate about an axis, suck air from one side of the blower device in an axial direction of the centrifugal fan, and blow the air outward in a radial direction of the centrifugal fan from a center located at the axis;
an air flow guide disposed between the centrifugal fan and an other side of the blower device in the axial direction;
a casing accommodating the centrifugal fan and allowing the air to flow as an air flow toward the other side in the axial direction; and
a cooling heat exchanger accommodated in the casing, disposed between the air flow guide and the other side in the axial direction, wherein
the air flow from the centrifugal fan includes:
a first air flow that is from the centrifugal fan, bent toward the other side in the axial direction, and then toward the other side in the axial direction; and
a second air flow that is from the centrifugal fan, bent toward the other side in the axial direction, and then bent inward in the radial direction,
a first pressure loss is a pressure loss generated in the first air flow between the centrifugal fan and an end of the air flow guide facing the other side in the axial direction,
a second pressure loss is a pressure loss generated in the second air flow between the centrifugal fan and the end of the air flow guide facing the other side in the axial direction,
a first pressure loss ratio is a divided value obtained by dividing the second pressure loss by the first pressure loss,
a third pressure loss is a pressure loss generated in the first air flow between the centrifugal fan and an end of the air flow guide facing the one side in the axial direction,
a fourth pressure loss is a pressure loss generated in the second air flow between the centrifugal fan and the end of the air flow guide facing the one side in the axial direction,
a second pressure loss ratio is a divided value obtained by dividing the fourth pressure loss by the third pressure loss,
the air flow guide is configured to make the first pressure loss ratio smaller than the second pressure loss ratio,
the casing is a casing for a vehicle air conditioner,
the casing forms the air flow guide configured to generate the first pressure loss in the first air flow by obstructing the first air flow toward the other side in the axial direction,
the air flow guide includes an inlet-side casing, a guide casing, and an outlet-side casing,
the inlet-side casing, the guide casing, and the outlet-side casing are connected to each other in the axial direction to form an air flow passage within the inlet-side casing, the guide casing, and the outlet-side casing, the centrifugal blower is disposed in the inlet-side casing, a cross-sectional area of the air flow passage of the outlet-side casing is smaller than a cross-sectional area of the air flow passage of the inlet-side casing, a distance between the guide casing and the axis of the centrifugal fan in a radial direction decreases in the axial direction from one side to the other side, the cooling heat exchanger is configured to cool the first air flow and the second air flow that have passed through the air flow guide, the cooling heat exchanger is disposed in the outlet-side casing, the air flow guide further includes an upstreaming casing, the upstreaming casing is connected to the one side of the inlet-side casing in the axial direction to form the air flow passage within the inlet-side casing, the guide casing, the outlet-side casing and the upstreaming casing, a cross-sectional area of the upstreaming casing is equal to a cross-sectional area of the inlet-side casing, and the upstreaming casing is disposed upstream of the centrifugal blower.

\* \* \* \* \*